United States Patent [19]

Visser

[11] Patent Number: 4,593,537

[45] Date of Patent: Jun. 10, 1986

[54] VERTICAL PLATE FREEZER APPARATUS

[76] Inventor: Klaas Visser, P.O. Box 588, Bendigo, Victoria 3550, Australia

[21] Appl. No.: 614,018

[22] Filed: May 25, 1984

[51] Int. Cl.$^4$ ............................................. A23G 9/00
[52] U.S. Cl. ..................................... 62/345; 100/198; 100/218
[58] Field of Search .................... 62/345, 347, 341; 100/198, 218

[56] References Cited

U.S. PATENT DOCUMENTS

| | | | |
|---|---|---|---|
| 729,807 | 6/1903 | Stovekin et al. | 100/198 X |
| 3,306,445 | 2/1967 | Moziek | 100/198 X |
| 3,981,802 | 9/1976 | Schotten et al. | 100/198 X |
| 4,083,199 | 4/1978 | Gram | 62/341 |
| 4,178,773 | 12/1979 | Wakeman | 62/341 |
| 4,337,695 | 7/1982 | Clendamel | 100/198 X |
| 4,342,205 | 8/1982 | Gram | 62/341 |
| 4,362,616 | 12/1982 | Gehrmann et al. | 100/198 X |

FOREIGN PATENT DOCUMENTS 530424  7/1983  Australia ............................ 62/341

Primary Examiner—William E. Tapolcai
Attorney, Agent, or Firm—James C. Wray

[57] ABSTRACT

Plate freezer apparatus has a plurality of vertically disposed refrigerated plates separated from each other by spacer frames to define a plurality of open topped compartments to receive product to be frozen. The assembly of plates and spacer frames are held together by spring tensioned rods which apply a compressive force to the assembly. Each plate has a number of wedge surfaces and a plate separating device engages the wedge surfaces of an adjacent pair of plates to thereby separate those plates to enable the spacer frame and frozen material therebetween to be withdrawn. The frozen material is removed from the spacer frame which is then re-inserted between the separated plates and the separating device removed before the compartment is refilled with product to be frozen.

28 Claims, 12 Drawing Figures

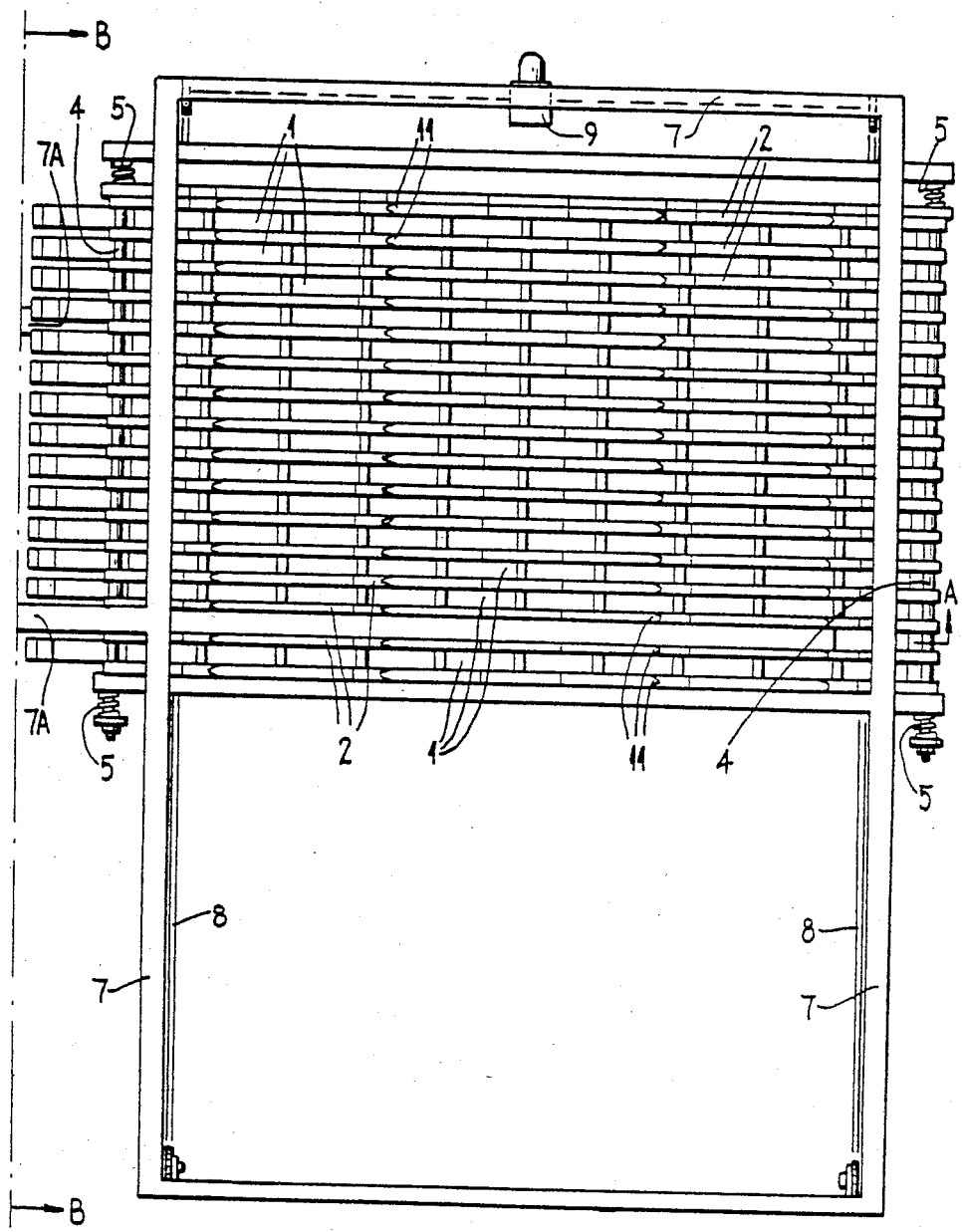
FIG_1B

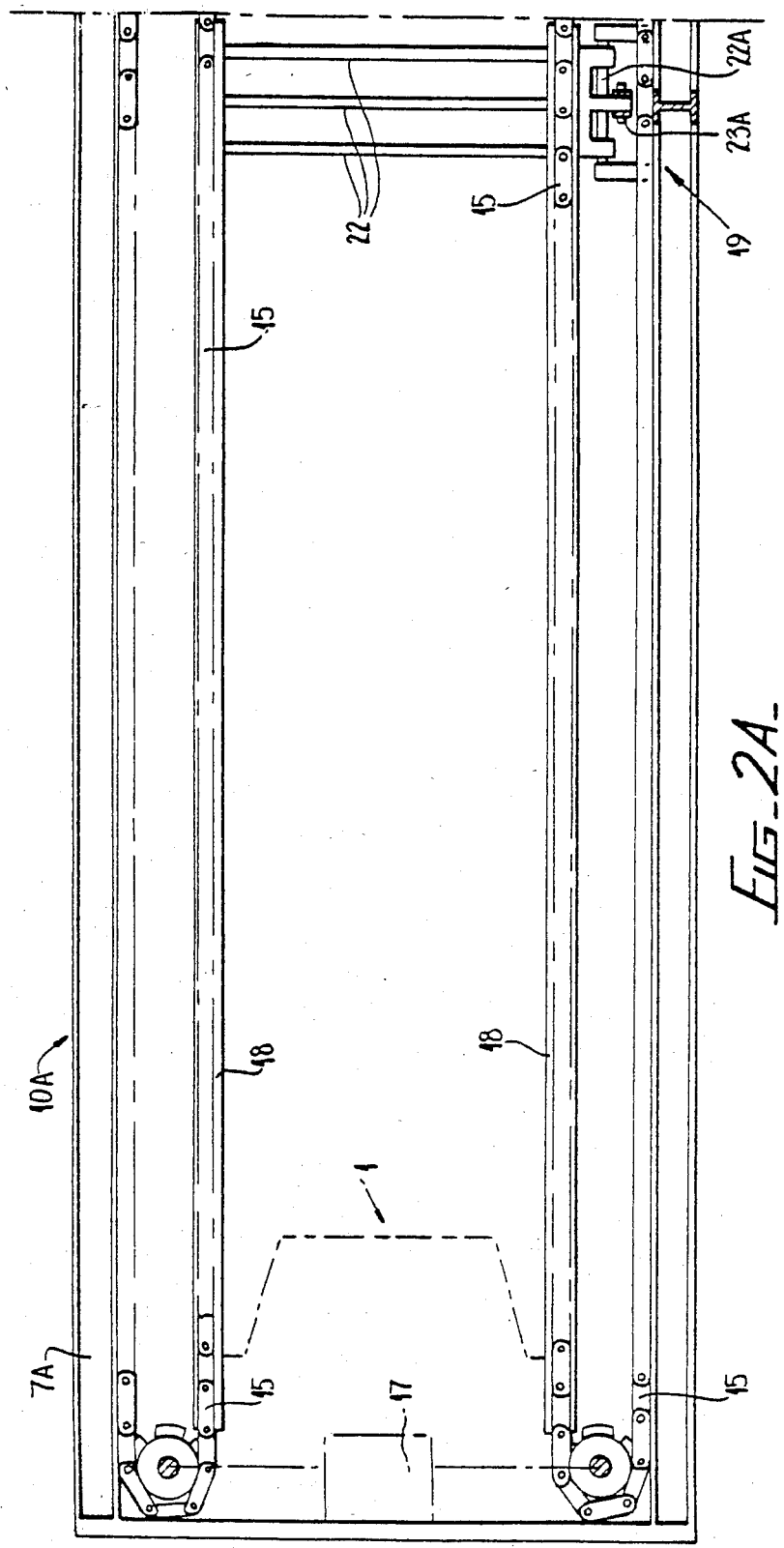

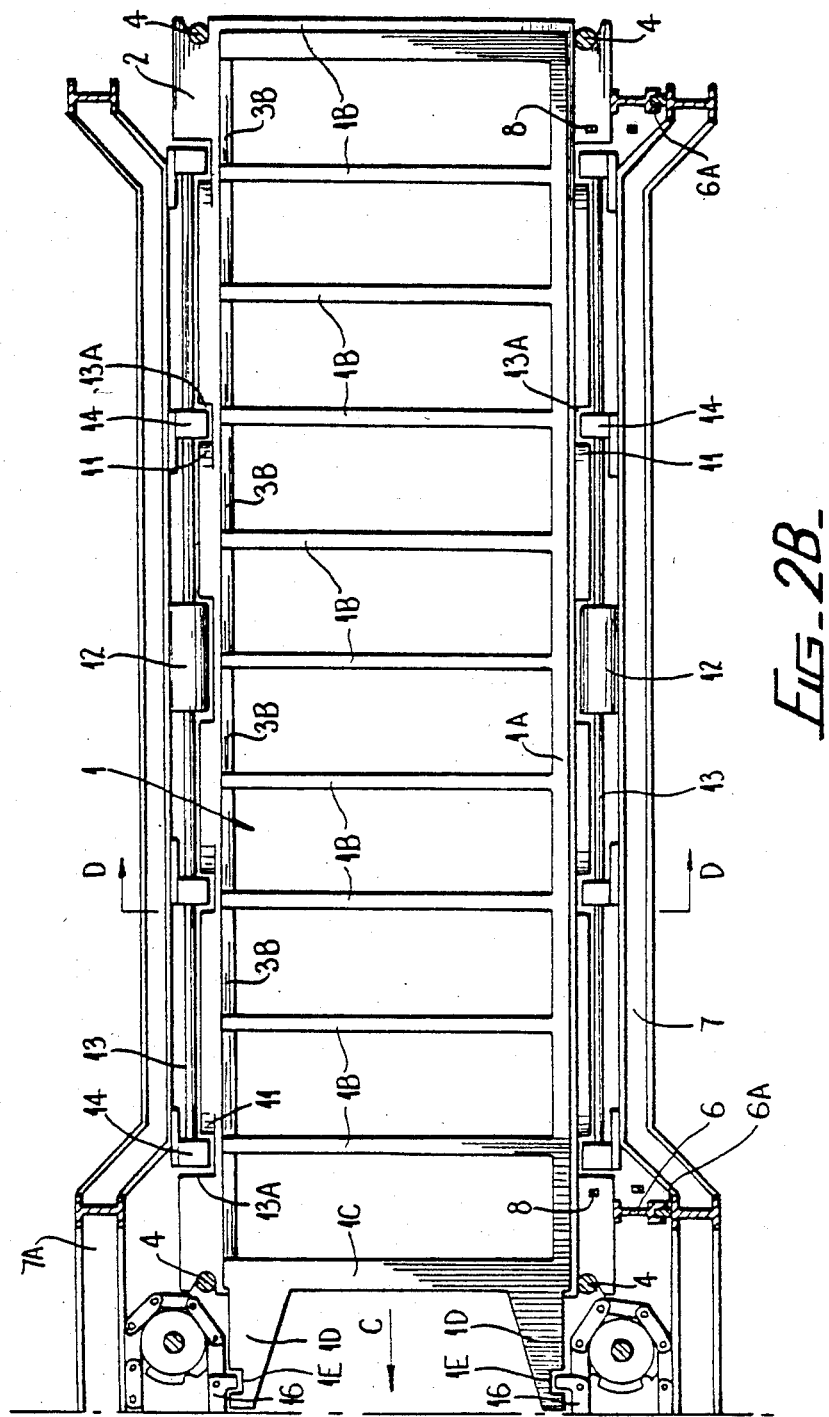

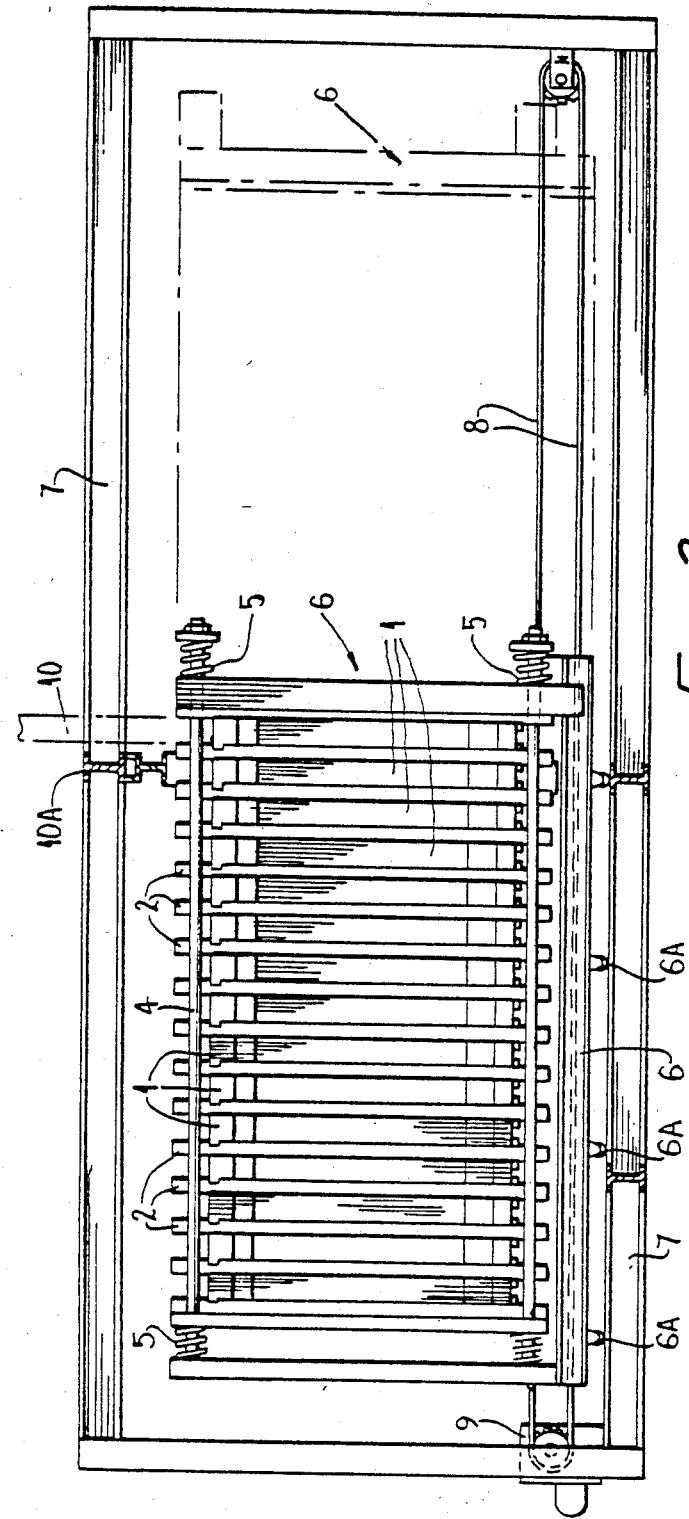

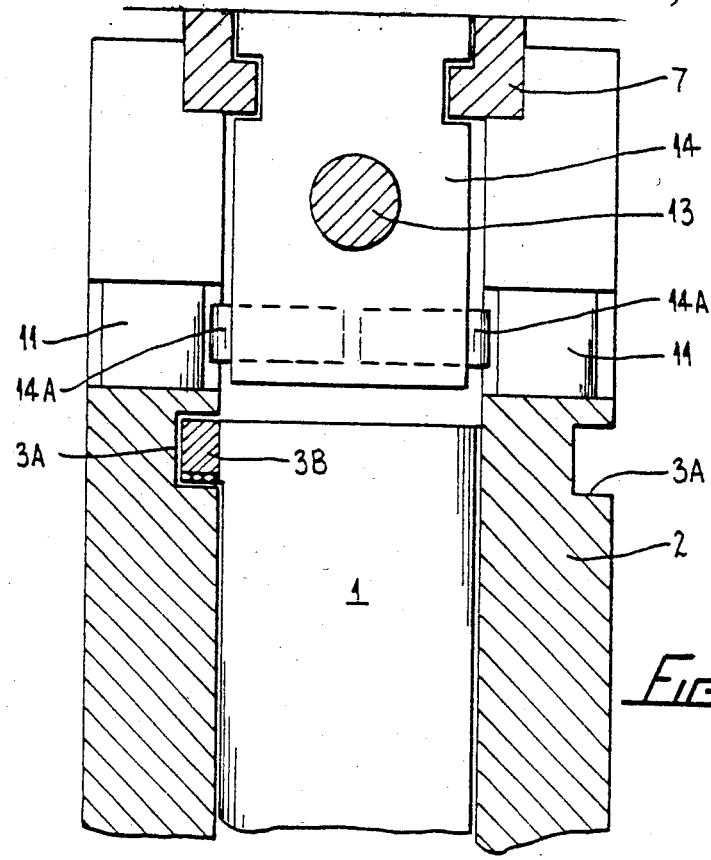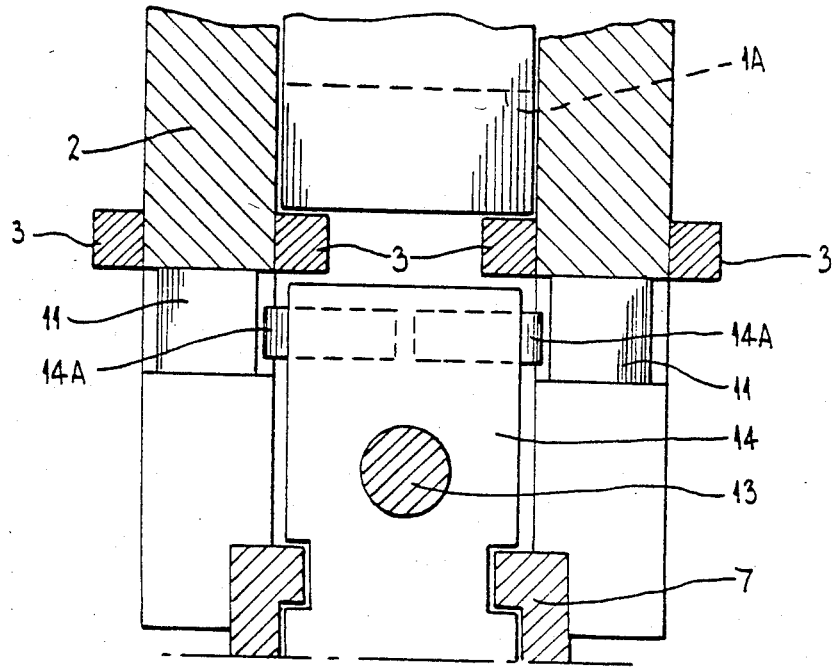
Fig. 5

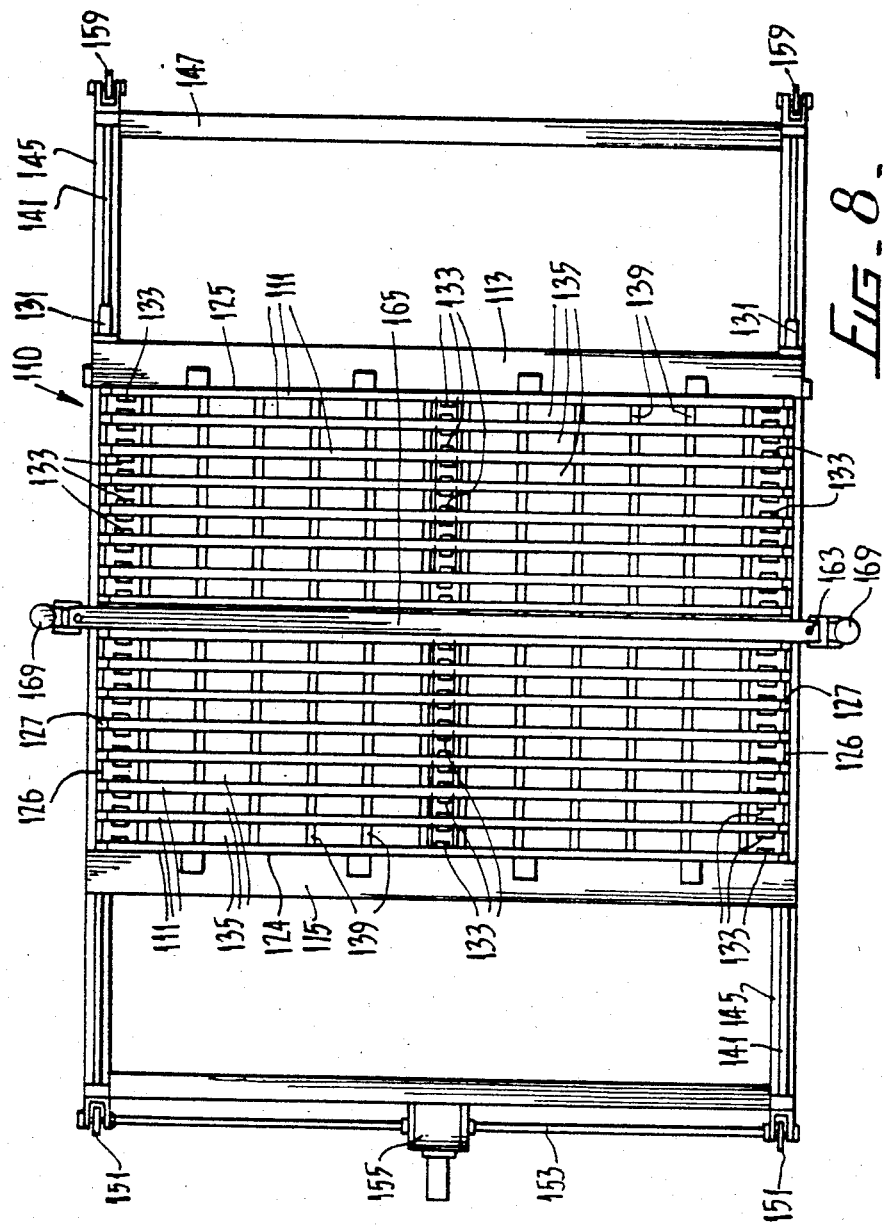

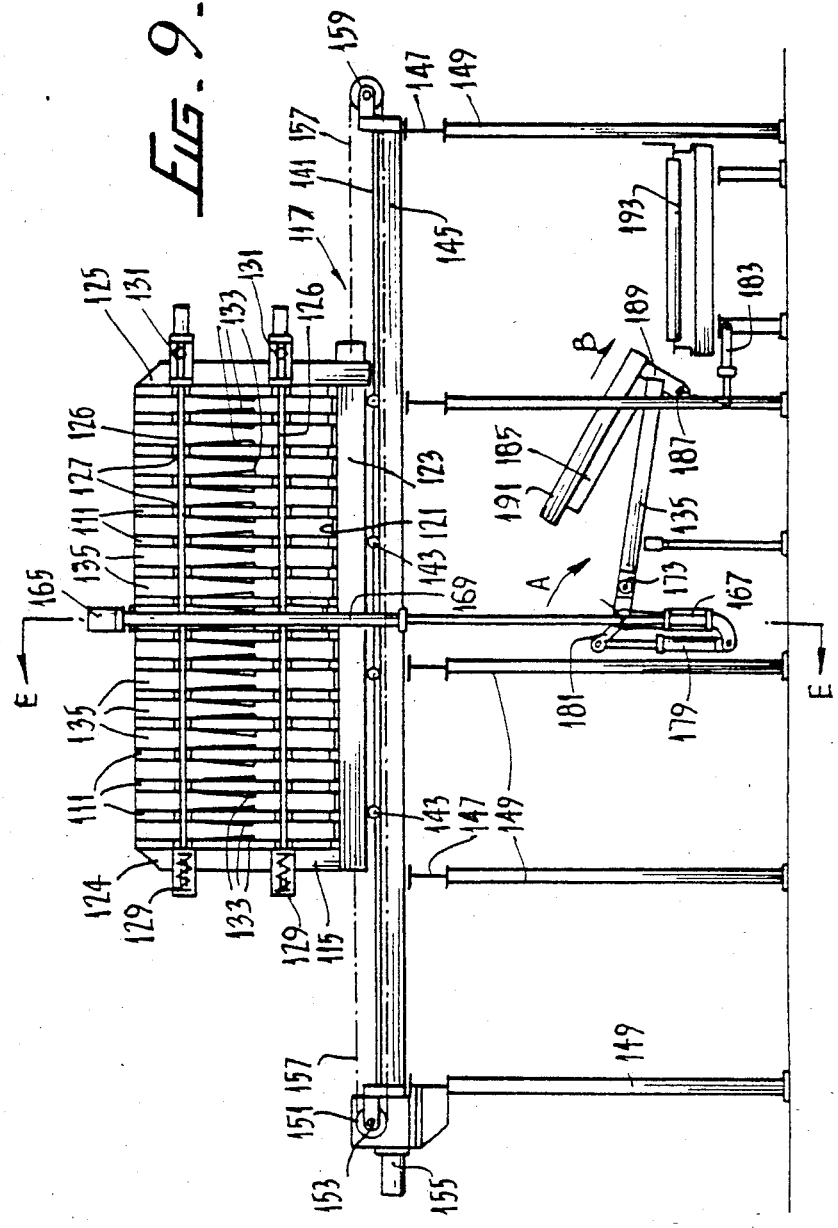

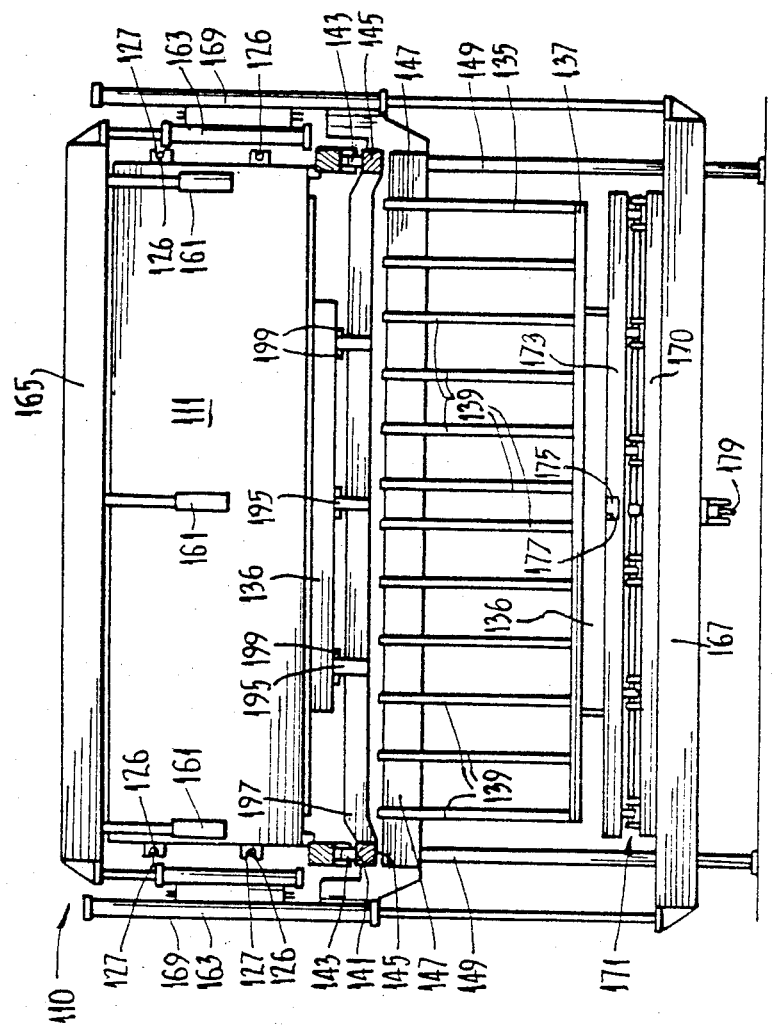

VERTICAL PLATE FREEZER APPARATUS

BACKGROUND OF THE INVENTION

This invention relates to apparatus for freezing foodstuffs and relates particularly to apparatus for continuous freezing of foodstuffs and removal of the frozen material from the freezing apparatus.

Plate freezers are well known and have hitherto been made in a great variety of designs and sizes. Such plate freezers comprise a plurality of refrigerated plates between which material, such as foodstuffs, is frozen. One form of plate freezer apparatus is that described in my Australian Pat. No. 530,424 filed Nov. 29, 1976.

In plate freezer apparatus, it is desirable that the material to be frozen can be quickly loaded into the space between adjacent refrigerated plates and that frozen material can be relatively quickly and simply removed from the apparatus.

It is also desirable that the filling and unloading of the apparatus be as automatic as possible.

BACKGROUND ART

Various forms of plate freezers have been proposed to improve the efficiency of operation of the plate freezing apparatus and to improve the throughput of product to be frozen.

In U.S. Pat. No. 4,083,199 there is disclosed plate freezer apparatus comprising a plurality of vertical refrigerated plates spaced apart to define freezing spaces therebetween which accommodates product to be frozen. The plates are all movable together so as to increase the spacing therebetween to enable frozen product to be removed. An emptying device comprises a plurality of combs with teeth which extend into the freezing space and are locked into the product when frozen. When the plates are separated the combs are lifted as a unit to lift the frozen material from the spaces.

This apparatus operates as a batch freezing system with all product frozen at one time and all frozen product being removed together prior to the freezing spaces being subsequently filled with further product to be frozen.

U.S. Pat. No. 4,178,773 discloses another form of plate freezer in which a number of horizontally disposed freezer plates receive product to be frozen in pre-formed containers. With this form of apparatus the individual containers are covered by a spacer frame to facilitate movement of the product onto and off the respective refrigerated plates.

This apparatus is designed specifically for use with special product containers thus necessitating particular forms of spacer frames which surround the containers.

It is an object of the invention to provide improved plate freezer apparatus which can operate to continuously freeze product and wherein selected frozen product is simply removed from the apparatus.

SUMMARY OF THE INVENTION

According to the present invention there is provided plate freezer apparatus comprising an assembly of a plurality of substantially parallel freezer plates spaced apart from each other by interposed spacer means, the freezer plates and spacer means defining a plurality of cells adapted to receive material to be frozen, each freezer plate being adapted to be supplied with refrigerant or coolant fluid, compression means to maintain said plates and spacer means of said assembly in engagement whilst enabling separation of at least one adjacent pair of plates to facilitate removal of the spacer means from therebetween, separation means to selectively separate the plates of at least one adjacent pair of plates, withdrawal means adapted to engage the spacer means between the separated plates and to withdraw said spacer means together with frozen material from between the separated plates and means for removing said frozen material from engagement with said spacer means.

Preferably, said spacer means comprises a frame located between each adjacent pair of plates whereby separation of the plates enables removal of said spacer frame together with frozen material.

In one form of the invention, the plate freezer apparatus comprises a single tier of a plurality of substantially vertically disposed freezer plates substantially equally spaced from each other and defining a freezing space between each adjacent pair of plates. A spacer frame is located in each freezing space and cooperates with the adjacent freezing plates to define one or more open top freezing spaces with the peripheral sides and bottom of the said freezing space being delimited by the spacer frame.

The plurality of freezer plates and spacer frames are held together in compressive abutment by compression means. The compression means may comprise tension members or tie rods extending substantially at right angles to the plane of the freezer plates. One end of each tension member engages with spring means which act on an end freezer plate while the other end of said tension members acts on the other end freezer plate, preferably through another spring, whereby the spring pressure holds the freezer plates in compressive abutment with the spacer frames. If desired, additional hydraulic means may be provided whereby the compressive force may be maximized by use of said hydraulic means but which also permits separation of the freezer plates while said hydraulic means is inactive or operating at reduced pressure and the compressive force is applied by said spring means.

It is also preferred that wedge means are provided on each freezer plate, said wedge means being adapted to cooperate with wedge spacers movable between wedge means of adjacent plates whereby said adjacent plates are separated. It will be understood that separation of the plates is intended to mean that the spacer frame located between the separated plates is no longer compressively engaged by the adjacent plates and consequently may be removed from therebetween.

The invention also comprises removal apparatus for use in association with plate freezer apparatus as above described to remove frozen material from adjacent pairs of freezer plates. The removal apparatus comprises means for separating two adjacent freezer plates whilst maintaining the remaining freezer plates in compressive abutment, means for engaging the spacer frame between the separated plates, means for moving in a horizontal direction the spacer frame and frozen material from between the separated plates, means for separating the frozen material from the said spacer frame and means for relocating said spacer frame between the separated plates whereafter the plate separation means is removed and the plates are subjected to the compressive abutment force.

In order that a selected spacer frame may be removed from between its associated pair of plates, the assembly of freezer plates is movable relative to the removal apparatus. Appropriate indexing means is provided to enable a selected spacer frame to be positioned adjacent the removal apparatus. Alternatively, the assembly of freezer plates may be fixed and the removal apparatus is movable relative thereto. In this arrangement, the removal apparatus is provided with appropriate indexing means.

Preferably, a filling station for loading material to be frozen into an empty freezing space is located adjacent the plate separation means whereby, after said separation subsequent removal of the frozen material from between a pair of plates and relocation of the spacer means, an indexing movement locates the empty freezing space at said filling station so that said freezing space may be refilled with material to be frozen.

In one form of the invention, the filling station is located above said plates and the freezing space is filled through the open top.

In order that the invention will be more readily understood embodiments thereof will now be described with reference to the accompanying drawings.

DESCRIPTION OF THE DRAWINGS

FIGS. 1A and 1B are a plan view of a freezer plate assembly and withdrawal means, FIGS. 2A and 2B are a sectional view along line A—A of FIGS. 1A and 1B, FIG. 3 is a sectional view along line B—B of FIG. 1B, FIG. 4 is a sectional view along line C—C of FIG. 1A, FIG. 5 is a sectional view along line D—D of FIG. 2B, FIGS. 6 and 7 are detailed views of the wedge means and wedge spacers provided for separating the freezer plates of the assembly, FIG. 8 is a plan view of a second embodiment of plate freezer apparatus according to the present invention, FIG. 9 is a side elevational view of the plate freezer apparatus of FIG. 8, and FIG. 10 is a sectional view taken along lines E—E of FIG. 9.

DESCRIPTION OF PREFERRED EMBODIMENTS

Figures 1A, 4:
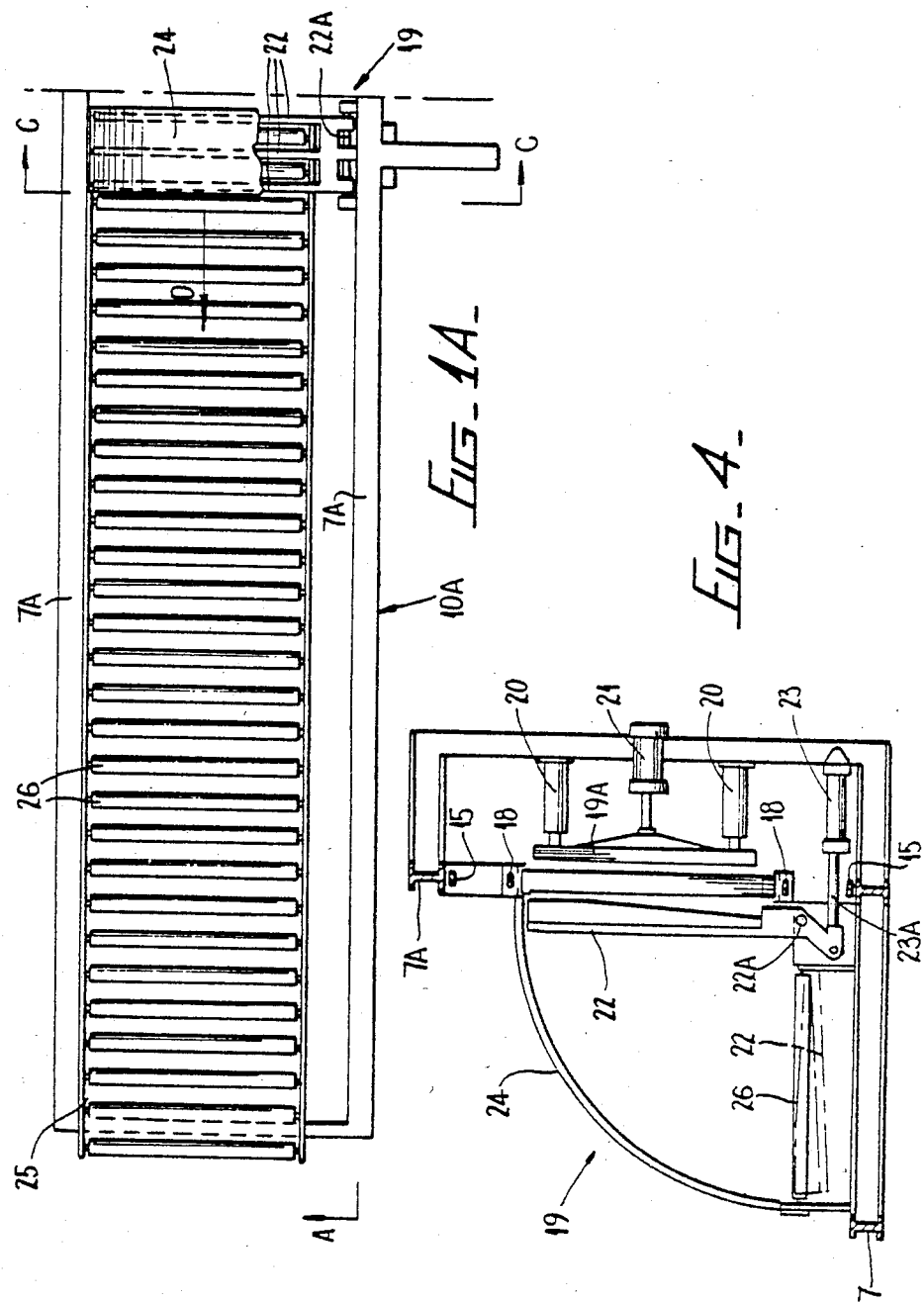

Referring firstly to FIGS. 1A and 1B and 2A and 2B there is shown an assembly of freezer plates 2 having open topped freezer plate spacing frames 1 located therebetween. Freezer plates 2 are vertically extending hollow substantially rectangular plates which are arranged to be refrigerated by the passage of refrigerant or coolant therethrough. The assembly of plates 2 is carried on tie bars 4 extending through each of the corners of the plates 2. A compression spring 5 engaged on each end of each tie bar 4 acts to apply compressive forces to the plates 2 thereby compressively engaging the freezing frames 1 between adjacent plates 2.

As is best seen in FIG. 3, the whole assembly is supported on a carriage 6 provided with wheels 6A adapted to run on structural frame 7. Thus carriage 6 is arranged to be positioned by moving from left to right as seen in FIG. 3. The movement of carriage 6 is achieved by means of chains 8 shown in ghosted lines in FIG. 3. The chains 8 are driven by a reduction gear box and motor 9 (details not shown) the position of which is indicated in FIG. 1B and 3.

Referring again to FIG. 3, the motion of carriage 6 is intermittently controlled to provide a dwell period for each freezing frame 1 beneath a filling station 10. In the arrangement shown sequential filling of the space defined by the spacer frames 1 and adjacent freezing plates 2 is achieved by moving carriage 6 as previously described. Located immediately adjacent the filling station 10 is frame withdrawal means 10A. This location enables filling station 10 to fill one freezing space whilst the immediately adjacent freezing space to the left as seen in FIG. 3, is emptied so that advancing of carriage 6 i.e. indexing of carriage 6 from the left to the right after withdrawal of frozen material enables the space just emptied to be filled. In this manner carriage 6 moves intermittently from left to right until all freezing spaces are filled whereafter the carriage 6 may then be moved all the way back to the left recommence the emptying/filling cycle from left to right as above described.

The cycle time is arranged so that suitable freezing of the material between adjacent plates 2 is achieved. It may be desirable for enabling rapid withdrawal of frames 1 to defrost or warm the all, or selected pairs of plates 2, for example, by circulating warm fluid therethrough, so eliminating or minimising any ice seal or the like which may develop between the spacer frames 1, slabs of frozen material and the plates 2.

Figure 6:
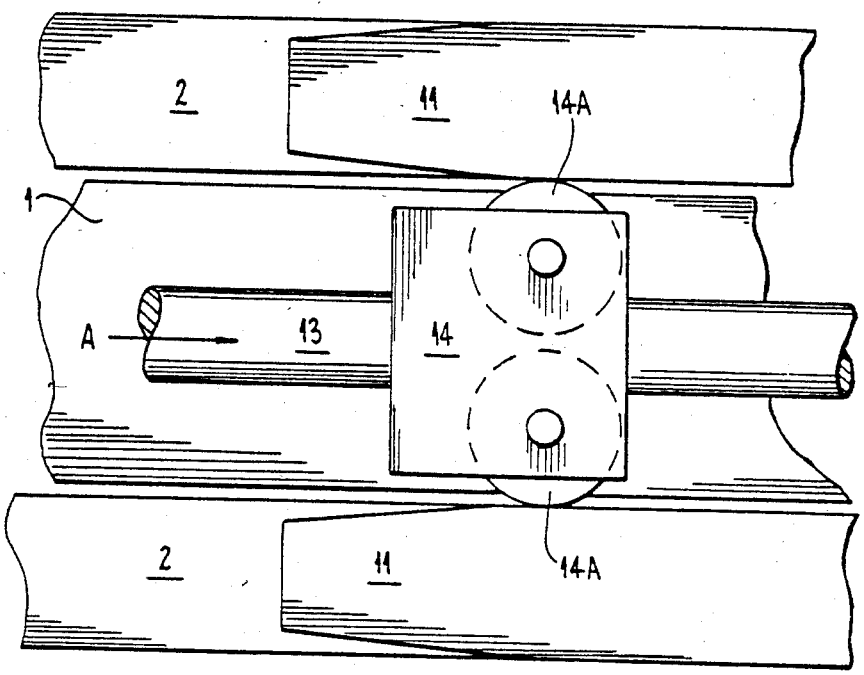
Figure 7:
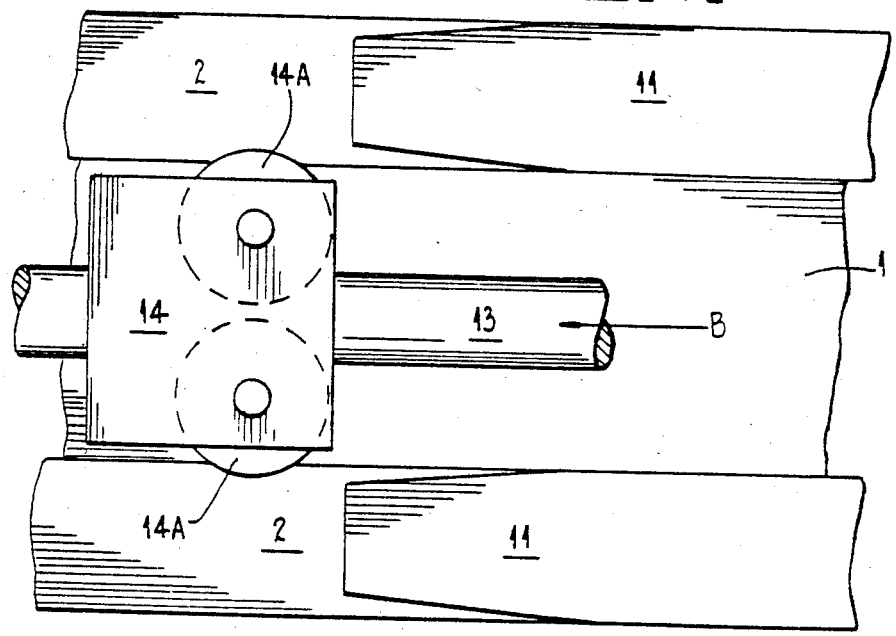

To enable the frozen material to be withdrawn from between the plates 2 at the withdrawal means 10A, a plate separating means is provided. As is best seen in FIGS. 1B and 2B, the plate separating means includes a plurality of wedge surfaces 11 on the top and bottom of each plate 2. The location of the wedge surfaces 11 is shown in FIGS. 1B and 2B, however, the operation thereof is shown in greater detail in FIGS. 6 and 7.

A pair of hydraulic cylinders 12 are mounted on the structural frame 7, at the position of the withdrawal means 10A, above and below the freezer plates 2. Each cylinder 12 is double ended and a piston rod 13 extends from each end of each cylinder 12. The piston rods each carry a pair of wedge spacers 14 which include a pair of rollers 14A adapted to engage with the wedge surfaces 11 of opposed plates 2 located at the withdrawal station 10A. As can be appreciated by reference to FIG. 6 insertion of wedge spacers 14 in the direction of arrow A between adjacent wedge surfaces 11 effects separation of adjacent plates 2, whereas withdrawal of the wedge spacers 14 as indicated by arrow B in FIG. 7 allows the compressive force of springs 5 to re-engage plates 2 with the frame 1 located therebetween.

Whereas each of plates 2 is provided with wedge surfaces 11, the hydraulic cylinders 12 and piston rods 13 are only located in alignment with the withdrawal means 10A. As seen in FIG. 2B the upper and lower edges of the plates 2 are provided with slots 13A so as to enable free movement of plates 2 past the cylinders 12 and wedge spacers 14 during indexing of carriage 6.

In operation, a dwell period is provided during the indexing of carriage 6 during which frozen slabs are removed by withdrawal means 10A. During this dwell period cylinders 12 are activated so retracting rods 13 and drawing the rollers 14A into engagement with wedge surfaces 11 thereby forcing apart the two plates 2 located at withdrawal means 10A. Withdrawal of frame 1 is then effected, frozen slabs are removed therefrom, frame 1 is reinserted between plates 2, cylinder 12 is deactivated so releasing rods 13 and the wedge spacers 14 and enabling springs 5 to reclamp frame 1 between plates 2, whereafter indexing of carriage 6 may recommence.

Withdrawal means 10A is supported by an extension 7A of structural frame 7, which extension 7A extends to the left of carriage 6 as seen in FIG. 2B. The means by which frames 1 are horizontally guided during withdrawal will now be described.

FIG. 5 should be referred to in conjunction with FIGS. 2A and 2B. FIG. 5 is taken along section line D-D of FIG. 2B but additionally shows the configuration of plates 2 adjacent the frame 1. Along the bottom edges of plates 2 there are provided rails 3 upon which frame 1 rests after separation of the plates 2. Additionally frame 1 is provided with a side rail 3B which is received in a groove 3A in one of the adjacent plates 2, namely the left hand plate 2 as seen in FIG. 5. Rails 3 thus horizontally support frame 1 when plates 2 are parted by wedge spacers 14.

Referring now to FIGS. 2A and 2B, it should be appreciated that frame 1 consists of a bottom horizontal member 1A, a plurality of vertically extending tines 1B and frame side rail 3B. The cells so formed between the tines 1B are open-topped so enabling ingress of material to be frozen from filling station 10. At the left hand end of frame 1 the end tine 1C is provided with extension arms 1D having notches 1E.

Withdrawal means 10A is provided with guides 18 at the top and bottom thereof and is further provided with two endless chains 15, one at the top and the other at the bottom of extension frame 7A. Each chain 15 is provided with a lug 16 which is adapted to be engaged with notch 1E after the frame 1 is indexed into position. A hydraulic motor 17 (indicated by ghosted lines in FIG. 2A) is arranged to intermittently drive chains 15 whereby the lugs 16 withdraw frame 1 (in the direction of arrow C in FIG. 2B) from between plates 2 which have been previously separated. Thus frame 1 slides on the rails 3 from between plates 2 to a position between guides 18 which guides 18 act to hold frame 1 in an upright (vertical) position. Frame 1 is withdrawn to a position where the first of the cells aligns with an ejection mechanism 19, where it dwells.

As seen in FIGS. 1A and 1B and 2A and 2B, ejection mechanism 19 is located adjacent carriage 6 in line with withdrawal means 10A. A detailed view of ejection mechanism 19 is provided in FIG. 4. A pushing head 19A is supported by guide rods 20 and propelled by a hydraulic cylinder 21. In use, the pushing head 19A pushes a frozen slab from the cell of frame 1 into a fenced tined receiver 22. Pushing head 19A is then retracted. Receiver 22 is pivoted at its lower portion 22A about which it is rotated by means of a hydraulic cylinder 23 connected to receiver 22 by rod 23A. Receiver 22 is rotated through an angle of greater than 90°, preferably about 95° so lowering the frozen slab onto driven rollers 26. The slab is retained at the open end of the tines of receiver 22 by a curved guard 24. Rollers 26 are positioned so that the tines or receiver 22 pass therebetween to a position (shown in ghosted lines in FIG. 4) below rollers 26 so depositing the frozen slab on to driven rollers 26 which then propels the slab away in the direction of arrow D in FIG. 1A. Receiver 22 is then raised back to the vertical position.

The frame 1 is then withdrawn until the next adjacent cell aligns with ejector mechanism 19, where it dwells until the ejection cycle is completed. In like manner frozen material is ejected from each of the cells of frame 1 in turn, whereafter hydraulic drive 17 is reversed so sliding frame 1 back into position between the separated plates 2. The wedge spacers 14 are retracted, springs 5 again clamp frame 1 between adjacent plates 2 and the carriage 6 is indexed to align the next frame 1 with withdrawal means 10A. This motion also serves to locate the frame 1 just emptied beneath the filling station 10. Thus ejection and fill cycles occur simultaneously during indexed advancement of the carriage 6 to the right as seen in FIG. 3.

It will be appreciated that in an alternative embodiment, not illustrated, withdrawal means, and/or the filling station may be indexed to move relative to the plate assembly, which may be fixed in position. With this construction, the plate separation apparatus and the withdrawal means 10A is mounted for indexed movement on rails to be sequentially aligned with each of the spacer frames 1 in turn. The filling station 10 can also be moved with the withdrawal means 10A or can be moved separately to fill empty cells as desired.

Referring to the drawings a freezer plate assembly 110 comprises a plurality of substantially vertically extending freezer plates 111 which are supported in a framework comprising cross members 113 and 115, end members 124 and 125 and lower track supports 123.

The cross member 113 and end member 125 are movable relative to the track supports 123. Tension rods 126 extend between end members 124 and 125 and engage through slots 127 on each end of each freezer plate 111. The freezer plates 111 are therefore able to slide relative to the tension rods 126. The lower edge of each freezer plate 111 is supported on each side on a track 121 carried by the track support 123. The freezer plates also are able to slide relative to the track 121.

At one end of the plate assembly 110 (left hand end as viewed in FIG. 9), springs 129 are provided to apply tension between the tension rods 126 and the fixed freezer plate end member 124. At the other end of the plate assembly 10, hydraulic rams 131 are interposed between the end of the tension rods 126 and the movable end member 124 to apply a tension to the rods 126 in addition to that provided by the springs 129, and the tension generated is transferred as a compressive force applied to the plate assembly 111.

A spacer frame 135 is provided between each adjacent pair of plates 111 of the plate assembly 110. The spacer frames 135 are held in compressive abutment with the associated plates 111. Each spacer frame 135 comprises a lower support member 136 carrying a bottom member 137 having a plurality of vertically extending finger members 139. Thus, each spacer frame 135 delimits a freezing space the thickness of which is the thickness of the spacer frame 135 and the periphery of which is defined by bottom member 137 and side finger members 139 and which is open at the top thereof. This open topped freezing space configuration enables the freezing space between adjacent plates to be filled from above. The plurality of fingers 139 divides each freezing space into a plurality of compartments or cells.

Each freezer plate 111 is provided on opposite side surfaces thereof with three plate wedges 133. The wedges 133 have an increasing thickness in the vertical direction, although horizontally disposed wedge formations may also be utilized as shown in the previous embodiment.

The freezer plate assembly and support structure 117 is movable along rails 141 on wheels 143 carried by the track support 123. The rails 141 are carried on a frame comprising upper members 145, lateral beams 147 and columns 149. Movement of the assembly 117 along the rails 141 is achieved by means of a geared motor 155 driving a pair of shafts 153 to each end of which are secured sprockets 151. A pair of chains 157 engages with each sprocket 151 and around idler sprockets 159 at the opposite end of the support structure, the ends of each chain being connected to the track supports 123.

An unloading station is located substantially centrally of the support frame and includes a pair of hydraulic cylinders 163, a drive beam 165 extending across the top of the plate assembly 110 and wedge spacers 161 carried by the drive beam 165. The wedge spacers 161, which are normally supported above the plate assembly 110, are movable downwardly by operation of the hydraulic ram 163 so that the spacers 161 drive between adjacent wedges 133 of a pair of adjacent plates 111. The wedge spacers 161 are preferably fitted with rollers (not shown) to reduce friction between the wedges 133 and the wedge spacers 161. The downward movement of the wedge spacers 161 is preferably interlocked with the operation of the rams 131 whereby the pressure exerted by the rams 131 is released prior to movement of the wedge spacers 161. Thus, the tension in the tension rods 126 comprises only the tension applied by the springs 129. At this reduced tension, the wedge spacers 161 engaging with the wedges 133 act to separate the adjacent plates 111.

As the wedge spacers 161 have a fixed location along the length of rail supports 145 indexing of the assembly 117 along the rails 141 is required to ensure separation of a desired pair of plates 111. When the desired freezer plates 111 are separated by operation of the wedge spacers 161, the spacer frame 135 located between these plates is no longer compressively abutted and may then be removed from between the plates. The unloading station further includes hydraulic rams 169 connected to a lifting beam 167.

Referring particularly to FIG. 10, there is shown a spacer frame 135 which has been removed from between a pair of plates 111 to enable slabs of frozen material removed therewith to be deposited onto a conveyor 193 (FIG. 9). The lifting beam 167 has a bottom hinge member 170 secured thereto and a top hinge member 173 is pivoted to the bottom hinge member 170 by means of pivot pin 171. The top hinge member 173 is provided with an interlocking device 175 which is adapted to engage and interlock with the spacer frame support member 136. The locking device 175 has a pair of wedges 177 which engage wedge shaped surfaces (not shown) in a recess in the frame support member 136. When the locking device 175 has interlocked the hinge member 173 to the frame support member 136, the rams 169 are reversed thereby lowering the frame 135 from between the separated plates 111.

Referring to FIG. 9, when rams 169 are fully extended, a further ram 179 is activated to push lever 181 in an upward direction thereby rotating the top hinge member 173 about the pin 171. The interlocked frame 135 is thereby moved in the direction of arrow A in FIG. 9, from a substantially vertical position to the position illustrated. A ram 183 is activated to rotate a plurality of lifting plates 185 which are fixed to a shaft 187 by means of suitable levers 189. The slabs of frozen material 191 are thereby lifted from the spacer frame 135 and are enabled to slide down plates 185, in the direction of arrow B, on to the conveyor 193.

The spacer frame may thereafter be replaced into the assembly 110, after an optional wash and rinse, by reverse operation of the rams 183, 179 and 169. With the spacer frame in position between the adjacent freezer plates 111, the wedge spacers 161 are removed so that the freezer plates and spacer frame are subjected to the compressive abutting forces exerted by the springs 129. Reactuation of the hydraulic rams 131 increases the tension in the rods 126 thereby substantially sealing the freezing space.

The plate and support assembly 117 is thereafter indexed one spacer frame spacing along the rails 141 thereby moving the just emptied spacer frame to a position beneath an adjacent filling station (not shown). In so doing, the spacer frame 135 is moved onto support members 195 (refer FIG. 10) which are fixed to the track supports 145 by means of cross members 197. Low friction wear strips 199 are fixed to the supports 195 to reduce the friction between the bottom of the spacer frames 135 and the supports 195.

The next spacer frame 135 carrying frozen material is then ready for removal from the assembly 110 in the manner above described.

In the preferred forms of the invention, the time taken to complete one cycle of emptying and filling the freezing space between the pairs of adjacent plates is the time necessary for the material to be frozen. Therefore, the apparatus of the invention operates in a continuous manner for freezing the material and extracting the slabs of frozen material for subsequent packaging.

I claim:

1. Plate freezer apparatus comprising a plurality of juxtaposed, substantially vertically disposed freezer plates, each adjacent pair of plates defining a freezing space therebetween, spacer means maintaining a predetermined minimum spacing between each adjacent pair of plates, compression means to hold the plurality of freezer plates and spacer means in assembled relationship as a plate and spacer assembly and plate separation means for selectively separating the plates of a selected pair to faciliatate removal of frozen material from the freezing space defined by the selected pair of plates, wherein said compression means includes two or more tension members extending the length of the plate and spacer assembly, one end of each tension member being operatively engaged with an end of said plates and the other end of each tension member having compression spring means to apply pressure to the opposite end plate whereby the compression spring means acts to apply a compressive force to the plate and spacer means assembly.

2. Plate freezer apparatus according to claim 1 wherein each said spacer means comprises a spacer frame removably positioned between adjacent plates whereby separation of said plates enables removal of the frame together with any frozen material in the freezing space.

3. Plate freezer apparatus according to claim 2 wherein each said spacer frame includes peripheral side and bottom members defining an open top freezing compartment.

4. Plate freezer apparatus according to claim 1 wherein hydraulic rams are associated with said one end of each tension member, said rams being actuatable to increase the compressive forces applied to said plate and spacer assembly.

5. Plate freezer apparatus according to claim 1 and including removing means for removing frozen material from between adjacent freezer plates, said means including a vertically movable member having engaging means adapted to be releasably attached in an upper position of the movable member to the spacer means between a selected pair of adjacent plates, the movable member being movable downwardly to draw the spacing means and frozen material from between the plates after the plates have been separated, and means to remove the frozen material from the spacer means.

6. Plate freezer apparatus according to claim 5 wherein said vertically movable member is moved by a pair of vertically extending hydraulic rams on each side of the apparatus.

7. Plate freezer apparatus according to claim 1 wherein the plates of each adjacent pair are provided with two or more wedges on at least one face of each plate, and said plate separation means includes two or more wedge spacers movable between each of the wedges on one of the selected adjacent plates and cooperating surfaces on the other adjacent plate whereby the plates are moved apart.

8. Plate freezer apparatus according to claim 7 wherein said cooperating surfaces comprises further wedges provided on the opposed face of the other adjacent plate.

9. Plate freezer apparatus according to claim 7 wherein said wedge spacers are secured to and extend downwardly from a cross-beam which extends across the top of the plate and spacer means assembly, said cross-beam being vertically movable by one or more hydraulic rams.

10. Plate freezer apparatus according to claim 1 wherein the plate and spacer means assembly is supported in a frame mounted on rails, and indexing means are provided to index movement of the frame along the rails to bring selected pairs of adjacent plates to the plate separating means.

11. Plate freezer apparatus according to claim 1 and including means to convey frozen material removed from the spacer means to a packing station.

12. Plate freezer apparatus according to claim 1 and including means for loading unfrozen material into empty freezing spaces.

13. Plate freezer apparatus comprising an assembly of a plurality of substantially parallel substantially vertically disposed freezer plates spaced apart form each other by interposed spacer means, the freezer plates and spacer means defining a plurality of cells to receive material to be frozen, each freezer plate being adapated to be supplied with refrigerant or coolant fluid, compression means to maintain said plates and spacer means of said assembly in engagement whilst enabling separation of at least one adjacent pair of plates to facilitate removal of the spacer means from therebetween, separation means to selectively separate the plates of at least one selected adjacent pair of plates, withdrawal means adapted to engage the spacer means between the separated plates and to withdraw said spacer means together with frozen material from between the separated plates to one side of the assembly and means for removing said frozen material from engagement with said spacer means, wherein each plate is formed with a plurality of wedge surfaces along opposed edge portions thereof, all the plates intermediate the end plates having such wedge surfaces on both sides of the plates, and said separation means for separating the selected adjacent plates includes a plurality of wedge spacers movable between opposed wedge surfaces of said selected adjacent plates, the wedge spacers having a dimension greater than the unseparated distance between opposed wedge surfaces, and means to move the wedge spacers between the opposed wedge surfaces to increase the spacing between the selected adjacent plates.

14. Apparatus according to claim 13 wherein said cells are open topped and a filling station is disposed above said assembly to load material to be frozen into said cells.

15. Apparatus according to claim 13 wherein said wedge spacers each include a pair of rollers to engage the respective wedge surfaces.

16. Apparatus according to claim 13 wherein said means to move the wedge spacers includes a pair of hydraulic or pneumatic cylinders located one adjacent each opposed edge portion of the plates to be separated, and piston rods extending from said cylinders, said wedge spacers being mounted on said piston rods.

17. Apparatus according to claim 13 wherein each said plate has rails along a lower edge thereof to support the spacer means when adjacent plates are separated.

18. Apparatus according to claim 18 wherein said spacer means each comprises a pair of spaced upper and lower members interconnected by a plurality of vertical intermediate members and two end members, the upper member being offset from the plane of the other members.

19. Apparatus according to claim 18 wherein each plate is formed with a groove to accommodate the offset upper member of the respective adjacent spacer means.

20. Apparatus according to claim 18 wherein one end member has a pair of arms integral therewith, the arms having means engageable by said withdrawal means.

21. Apparatus according to claim 13 wherein said withdrawal means includes a pair of lugs to engage with selected spacer means, means for moving said lugs in the plane of said selected spacer means towards and away from said assembly to thereby withdraw and replace said selected spacer means from said assembly when the plates adjacent said selected spacer means have been separated.

22. Apparatus according to claim 13 wherein said means for removing frozen material from said spacer means includes a pusher adapted to engage frozen material in said spacer means, means to move said pusher in a plane transverse to the plane of said spacer means, and conveyor means to receive and convey frozen material away from said assembly.

23. Apparatus according to claim 13 wherein said assembly is mounted in a frame carried on a track for movement transverse to the planes of said plates, and means are provided for incrementally moving said assembly along said track to sequentially position successive spacer means and adjacent plates at a plate separation and withdrawal means station.

24. Apparatus according to claim 13 wherein said assembly is relatively fixed and a plate separation and withdrawal station is moved incrementally relative to said assembly to sequentially position said separating means and withdrawal means adjacent successive spacer means and adjacent plates.

25. Apparatus according to claim 13 wherein said compression means comprises a plurality of tie rods each extending through holes or slots in said plates and spring means on at least one end of each tie rod acting against an endmost plate to tension the tie rods and thereby apply compressive forces to said assembly.

26. Plate freezer apparatus comprising a plurality of juxtaposed, substantially vertically disposed freezer plates, each adjacent pair of plates defining a freezing space therebetween; separate, removable spacer means between each adjacent pair of plates to maintain a predetermined minimum spacing therebetween; compression means to hold the plurality of freezer plates and spacer means in assembled relationship; plate separation means to separate the plates of a selected adjacent pair without separating plates of non-selected pairs, to facilitate removal of frozen material from the selected freezing space defined by the selected pair of plates, removing means to remove frozen material from the selected freezing space, and means to move the plate separation means to a selected freezing space.

27. Plate freezer apparatus according to claim 26 wherein said removing means for removing frozen material from between the selected pair of adjacent freezer plates includes a vertically movable member having engaging means adapted to be releasably attached in an upper position of the movable member to the spacing means between the selected pair of adjacent plates, the movable member being movable downwardly to draw the spacing means and frozen material from between the plates after the plates have been separated, and means to remove the frozen material from the spacer means.

28. Plate freezer apparatus comprising an assembly of a plurality of substantially parallel substantially vertically disposed freezer plates spaced apart from each other by interposed, separate, removable spacer means, the freezer plates and spacer means defining a plurality of cells to receive material to be frozen, each freezer plate being adapted to be supplied with refrigerant or coolant fluid, compression means to maintain said plates and spacer means of said assembly in engagement whilst enabling separation of at least one adjacent pair of plates to facilitate removal of the spacer means from therebetween, separation means movable relative to the assembly to selectively separate the plates of at least one selected adjacent pair of plates without separation of non-selected adjacent pairs of plates, withdrawal means adapted to move relative to the assembly and to engage the spacer means between the separated plates and to withdraw said spacer means together with frozen material from between the separated plates to one side of the assembly and means for removing said frozen material from engagement with said spacer means.

* * * * *